United States Patent
Ghuge et al.

(10) Patent No.: US 10,887,464 B2
(45) Date of Patent: Jan. 5, 2021

(54) CLASSIFYING A DIGITAL SPEECH SAMPLE OF A CALL TO DETERMINE ROUTING FOR THE CALL

(71) Applicant: International Business Machines Corporation, Armonk, NY (US)

(72) Inventors: Deepak Ghuge, Sangamner (IN); Sasikanth Eda, Vijayawada (IN); Manojkiran Eda, Vijayawada (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/268,391

(22) Filed: Feb. 5, 2019

(65) Prior Publication Data

US 2020/0252510 A1    Aug. 6, 2020

(51) Int. Cl.
| | |
|---|---|
| H04M 3/523 | (2006.01) |
| G10L 15/26 | (2006.01) |
| G10L 25/63 | (2013.01) |
| G10L 15/20 | (2006.01) |
| G06N 20/00 | (2019.01) |
| G10L 15/187 | (2013.01) |
| G10L 25/27 | (2013.01) |
| G06F 40/40 | (2020.01) |
| G06F 40/279 | (2020.01) |
| G10L 15/22 | (2006.01) |

(52) U.S. Cl.
CPC ........ *H04M 3/5233* (2013.01); *G06F 40/279* (2020.01); *G06F 40/40* (2020.01); *G06N 20/00* (2019.01); *G10L 15/187* (2013.01); *G10L 15/20* (2013.01); *G10L 15/26* (2013.01); *G10L 25/27* (2013.01); *G10L 25/63* (2013.01); *G10L 2015/227* (2013.01)

(58) Field of Classification Search
CPC .... H04M 3/5233; G10L 15/265; G10L 25/63; G10L 15/20; G06F 40/40
USPC ............ 379/265.12, 265.11, 265.05, 265.07, 379/265.01, 88.01
See application file for complete search history.

(56) References Cited

U.S. PATENT DOCUMENTS

| | | |
|---|---|---|
| 9,479,643 B1 | 10/2016 | Abuelsaad et al. |
| 2013/0144623 A1 | 6/2013 | Lord et al. |
| 2014/0156326 A1 | 6/2014 | DArcy et al. |

(Continued)

OTHER PUBLICATIONS

A. Davletcharova et al., "Detection and Analysis of Emotion From Speech Signals", dated 2015, Procedia Computer Science, Total 6 pages.

(Continued)

*Primary Examiner* — Thjuan K Addy
(74) *Attorney, Agent, or Firm* — David W. Victor; Konrad, Raynes, Davda and Victor LLP (57) ABSTRACT

Provided are a computer program product, system, and method for classifying a digital speech sample of a call to determine routing for the call. A digital speech sample of a call agent is processed to categorize speech as having an agent speech attribute. Information is received on a caller speech attribute initiating a call to the call center. The caller speech attribute results from categorizing a caller digital speech sample of the caller as having the caller speech attribute. A call agent of call agents having a call agent speech attribute that matches the caller speech attribute is selected and the call is routed to the selected call agent to process the call.

22 Claims, 8 Drawing Sheets

(56) References Cited

U.S. PATENT DOCUMENTS

2015/0003603 A1 1/2015 Odinak et al.
2019/0253558 A1* 8/2019 Haukioja ................ G10L 15/22

OTHER PUBLICATIONS

M. Rouse, "SearchNetworking.com: Cognitive radio (CR)", dated Nov. 10, 2008, (online), Retrieved from the Internet at URL>https://searchnetworking.techtarget.com/definition/cognitive-radio?vgnext, Total 1 page.

P. Dasgupta, "Detection and Analysis of Human Emotions Through Voice and Speech Pattern Processing", dated Oct. 2017, International Journal of Computer Trends and Technology (IJCTT)—vol. 52, Total 3 pages.

"Can This App Guess Where Your Accent is From? English Dialects Tool Predicts Your Hometown Based on How You Pronounce 26 Different Words" dated Jan. 11, 2016, (Online), Retrieved from the Internet at URL>https://www.dailymail.co.uk/sciencetech/article-3393935/Can-app-guess-accent-English-Dialects-tool-predicts-hometown-based-pronounce-26-different-words.html, Total 28 pages.

"New Voice Analysis Software Will Change the World", dated Oct. 15, 2014, (Online), retrieved from the Internet at URL>https://www.prnewswire.com/news-releases/new-voice-analysis-softwa/, Total 2 pages.

M. Sidana, "Top Five Emotion / Sentiment Analysis APIs for Understanding User Sentiment Trends", dated May 19, 2017, (online) Retrieved from the Internet at URL>https://medium.com/©sifium/top-five-emotional-sentiment-analysis-apis- . . .1, Total 12 pages.

"Voice Analysis", dated 2016, (online) Retrieved from the Internet at URL>https://www.sciencedirect.com./topics/medicine-and-dentistry/voice-analysis, Total 11 pages.

"Natural Language Classifier" (online), Retrieved from the Internet on Dec. 26, 2018 at URL>https://www.ibm.com/watson/services/natural-language-classifier/, Total 9 pages.

"Tone Analyzer", (Online) Retrieved from the Internet on Dec. 26, 2018, at URL>https://console.bluemixnet/docs/services/tone-analyzer/index html#about, Total 5 pages.

"With New Tone Analyzer IBM Watson Can Tell If Customers Are Satisfied or Frustrated on Its Own" Dated Jul. 20, 2017, (online) Retrieved from the Internet at URL>https://www.techrepublic.com/article/with-new-tone-analyzer-ibm-watso/, Total 1 page.

* cited by examiner

CLASSIFYING A DIGITAL SPEECH SAMPLE OF A CALL TO DETERMINE ROUTING FOR THE CALL

BACKGROUND OF THE INVENTION

1. Field of the Invention

The present invention relates to a computer program product, system, and method for classifying a digital speech sample of a call to determine routing for the call.

2. Description of the Related Art

Call agents in a call center take calls from callers for a specified purpose, such as customer support, assistance, and sales. Oftentimes, a substantial amount of time may be spent by the call agent determining whether they have the appropriate expertise to handle the call. One option is to have the user listen to an extended menu of options and select a particular topic of their call using their phone keypad. However, this process may frustrate the caller by having to spend time listening to the options, waiting for assistance if they do not understand the options or the options do not address their purpose for the call or having to reinitiate the call if they select the wrong option. Further, an assigned call agent may have difficulty understanding the speech of a caller, such as if the caller uses an unfamiliar accent or speech pattern, which may further delay call processing.

There is a need in the art for improved techniques for routing calls to call agents to reduce call time and optimize call processing.

SUMMARY

Provided are a computer program product, system, and method for classifying a digital speech sample of a call to determine routing for the call. A digital speech sample of a call agent is processed to categorize speech as having an agent speech attribute. Information is received on a caller speech attribute initiating a call to the call center. The caller speech attribute results from categorizing a caller digital speech sample of the caller as having the caller speech attribute. A call agent of call agents having a call agent speech attribute that matches the caller speech attribute is selected and the call is routed to the selected call agent to process the call.

DETAILED DESCRIPTION

In current call center processing, delays are experienced when routing a call to a call agent that lacks the required expertise to handle the call or is not personally suited to deal with calls from impatient or distressed callers. Further, call agents handling the call may have difficulty understanding a caller due to unfamiliarity with the caller speech patterns and dialect Described embodiments provide improvements to computer technology for routing calls at a call center that uses machine learning algorithms in the form of a speech analysis program to categorize call agent speech attributes by processing digital speech samples from the call agents and a caller speech attribute by processing a caller digital speech sample. A call agent is selected that has a speech attribute that matches the caller speech attribute so that the call is routed to the selected call agent. Speech attributes may also be determined by converting the caller digital speech sample to text and applying a natural language processor and tone analyzer machine learning algorithms to the converted text to determine an emotion or tone of the text and the topic of the text. This information determined from the text may then be used to find a call agent having information in profile information that has expertise to handle the determined topic of the text and to handle a caller whose tone indicates the caller is distressed.

The described embodiments provide improvements to computer technology for routing calls to a call agent in a call center by using machine learning algorithms to optimize call agent selection on one or more parameters, including speech attributes such as dialect and speech patterns of the caller and call agent, topic of the call with expertise of the call agent, and tone or emotion of the caller and expertise of the call agent in handling calls where the tone indicates the caller is distressed or upset. By using machine learning algorithms with profile information on caller and call agents to optimize selection of call agents most suited to handle the calls, delays in call processing are substantially reduced by routing a caller to a call agent having suitable expertise in the topic of the call and a call agent having speech attributes matching the speech attributes of the caller to optimize understanding between a call agent and caller.

Figure 1:
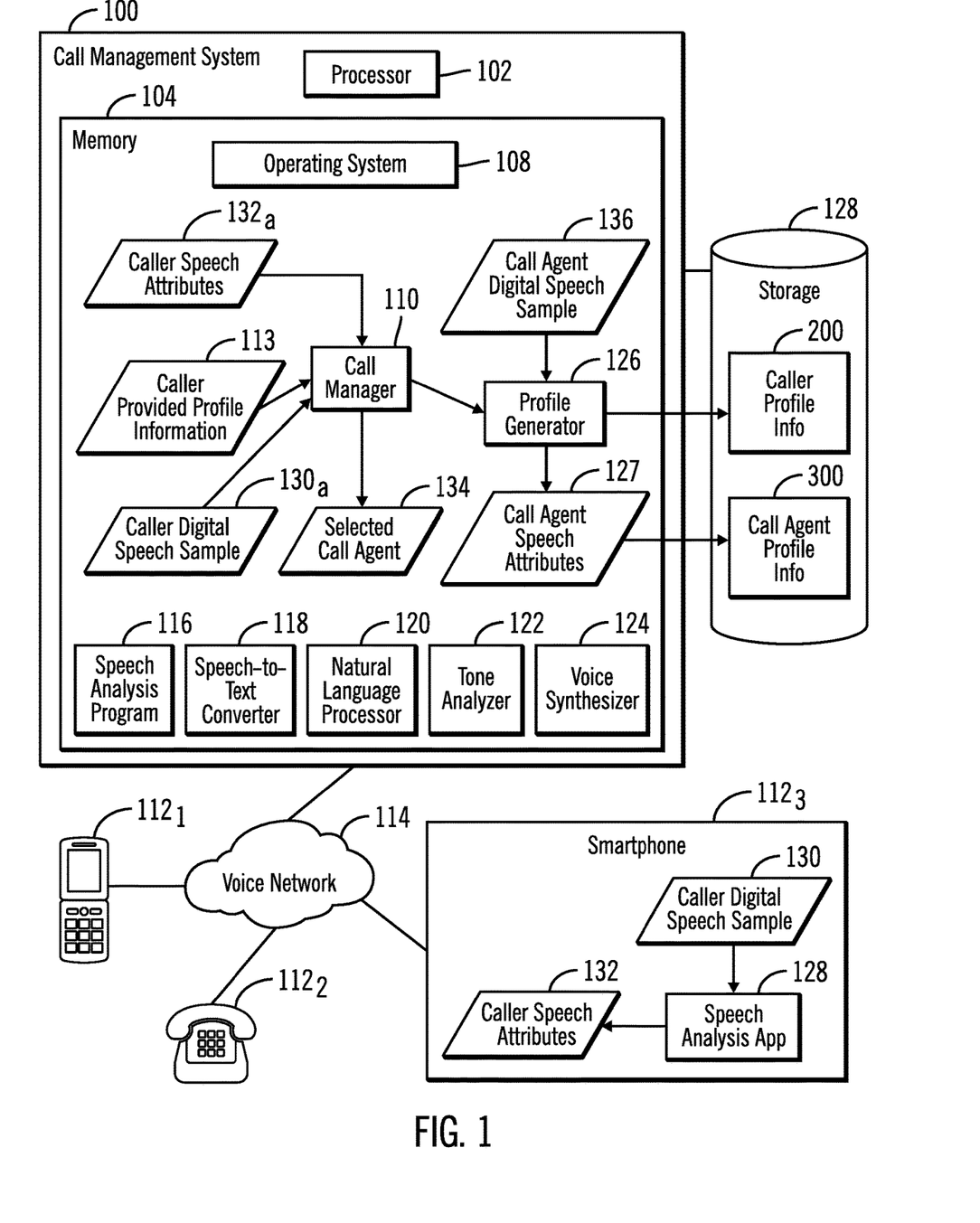
FIG. 1 illustrates an embodiment of a call management system in a voice network.

FIG. 1 illustrates an embodiment of a call management system 100 in which embodiments are implemented. The call management system 100 includes a processor 102 and a main memory 104. The main memory 104 includes various program components including an operating system 108; a call manager 110 to process a call, such as a customer service request or sales request, from a phone device $112_1$, $112_2$, $112_3$ over a voice network 114; a speech analysis program 116 to process a digital speech sample, such as in a received call or samples from call agents, to determine a tone of the speech, emotions, dialect, and speech patterns; a speech-to-text converter 118 to convert a digital audio sample, such as from a caller, to written text, such as by way of example the Watson™ Speech to Text program that converts audio and voice into written text; a natural language processor (NLP) 120, such as by way of example, the Watson™ Natural Language Understanding program, that interprets from text topics, entities, relationships, keywords, etc.; a tone analyzer 122, such as by way of example Watson™ Tone Analyzer to determine emotions and tone from the converted text of a phone call, such as frustrated, distressed, sad, satisfied, excited, polite, impolite, sympathetic, etc.; a voice synthesizer 124 to convert text to speech according to a specified dialect, speech pattern, etc.; and a profile generator 126 to update caller profile information 200 having information on callers and update call agent profile information 300 having information on call agents to handle calls from callers.

The caller profile information 200 and call agent profile information 300 may be implemented in database objects or tables, tables, and other data structures, and stored in a persistent storage 128.

The phones used by callers may comprise a mobile phone 112$_1$ that is not a smartphone, a landline phone 112$_2$, and a smartphone 112$_3$. The smartphone 112$_3$ may include a speech analysis program 116 that uses speech processing algorithms to classify a caller digital speech sample 130 as one or more speech attributes 132, such as emotions, tone, dialect, speech patterns, etc. The caller speech attributes 132 may be provided to the call management system 100 as caller speech attributes 132*a* that are supplied to the call manager 110 to include in caller profile information 200. In the smartphone embodiment, the call manager 110 does not have to call the speech analysis program 116 to determine caller speech attributes as this processing is performed by the speech analysis application 128 at the smartphone 112$_3$.

The call manager 110 upon receiving caller speech attributes 132*a* and caller provided profile information 113 supplied by the caller upon a first call may provide that information to the profile generator 126 to store in the caller profile information 200. The call manager 110 may further receive the caller digital speech sample 130 from a phone 112$_1$, 112$_2$, 112$_3$ comprising the voice call, and process to classify caller speech attributes, which are used with other information, to select a call agent 134 and route the call to the selected call agent 134. The profile generator 126 may receive a call agent digital speech sample 136 to use to generate speech attributes, such as dialect, speech pattern, etc., to include in the call agent profile information 300 to use for routing calls to the call agent.

The voice network 114 may comprise a telecommunication network for transmitting voice calls, such as one or more of a public switched telephone network (PSTN), a landline network, a wireless network, an integrated services digital network (ISDN), private branch exchange (PBX), etc.

The memory 104 may comprise suitable volatile or non-volatile memory devices.

The storage 128 may comprise a non-volatile storage device, such as one or more of a solid state drive (SSD), hard disk drive, and other types of storage devices, which may further be configured from an array of devices, such as Just a Bunch of Disks (JBOD), Direct Access Storage Device (DASD), Redundant Array of Independent Disks (RAID) array, virtualization device, etc.

Generally, program modules, such as the program components 108, 110, 116, 118, 120, 122, 124, 126, 128, may comprise routines, programs, objects, components, logic, data structures, and so on that perform particular tasks or implement particular abstract data types. The program components and hardware devices of the call management system 100 may be implemented in one or more computer systems, where if they are implemented in multiple computer systems, then the computer systems may communicate over a network.

The program components 108, 110, 116, 118, 120, 122, 124, 126 may be accessed by the processor 102 from the memory 104 to execute. Alternatively, some or all of the program components 108, 110, 116, 118, 120, 122, 124, 126 may be implemented in separate hardware devices, such as Application Specific Integrated Circuit (ASIC) hardware devices.

The functions described as performed by the program components 108, 110, 116, 118, 120, 122, 124, 126, 128 may be implemented as program code in fewer program modules than shown or implemented as program code throughout a greater number of program modules than shown.

Certain of the components, such as the speech analysis program 116 and 128, natural language processor 120, and tone analyzer 122 may use machine learning and deep learning algorithms to process digital speech samples or text and classify input into a category. In one embodiment, the speech analysis program 116, natural language processor 120, and tone analyzer 122 may comprise machine learning modules, such as artificial neural network programs. A neural network may be trained using backward propagation to adjust weights and biases at nodes in a hidden layer to produce a desired/correct categorization or outcome given the input. For instance, the speech analysis program 116 may be trained to output different attributes of the speech based on the characteristics (e.g., signal and wave form) of the audio signals, such as a dialectic, speech pattern categories (e.g., speed of speech, how words are bunched, loudness, etc.), emotion, etc. The natural language processor 120 may be trained to process text from a converted call to categorize the text as comprising a specific emotion, tone or categorize the topic or subject matter of the text. The tone analyzer 122 may be trained to process text converted from a call to categorize the text as having a specific tone or emotion.

In backward propagation used to train a neural network machine learning module, margin of errors are determined based on the actual categorization of the program 116, 120, 122, 128 and what should be the desired or expected output based on the input. Biases at nodes in the hidden layer are adjusted accordingly to decrease the margins of error in these measured outcomes. Backward propagation may comprise an algorithm for supervised learning of artificial neural networks using gradient descent. Given an artificial neural network and an error function, the method may calculate the gradient of the error function with respect to the neural network's weights and biases.

The machine learning modules of the programs 116, 120, 122, 128 may implement a machine learning technique such as decision tree learning, association rule learning, artificial neural network, inductive programming logic, support vector machines, Bayesian models, etc.

The arrows shown in FIG. 1 between the components 110, 126, 128 represent a data flow between the components.

The term "caller" and "call agent" as used herein may refer to a person or computer process, such as a bot.

Figure 2:
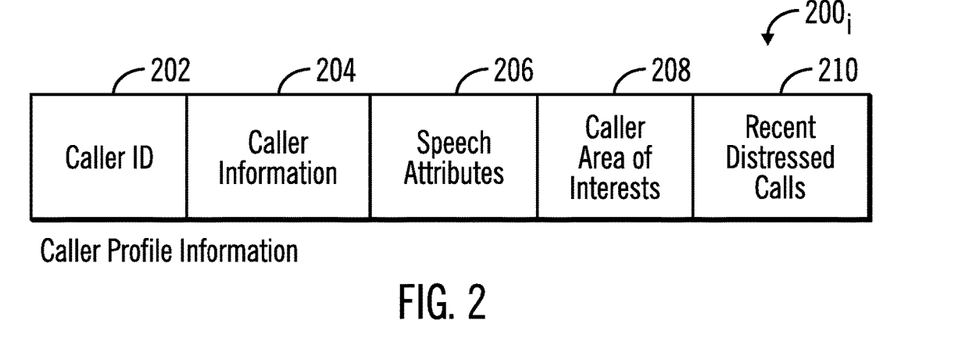
FIG. 2 illustrates an embodiment of caller profile information.

FIG. 2 illustrates an embodiment of an instance of caller profile information 200$_i$ for a caller in the caller profile information 200 having information including: a caller identifier (ID) 202; caller information 204, such as contact information; speech attributes 206, such as dialect, speech pattern, etc., that may be received in the caller speech attributes 132 from a smartphone 112$_3$, or determined by processing a caller digital speech sample 130*a*; caller area of interests 208, such as the topic or subject matter they may be calling about; and information on recent distressed calls 210.

Figure 3:
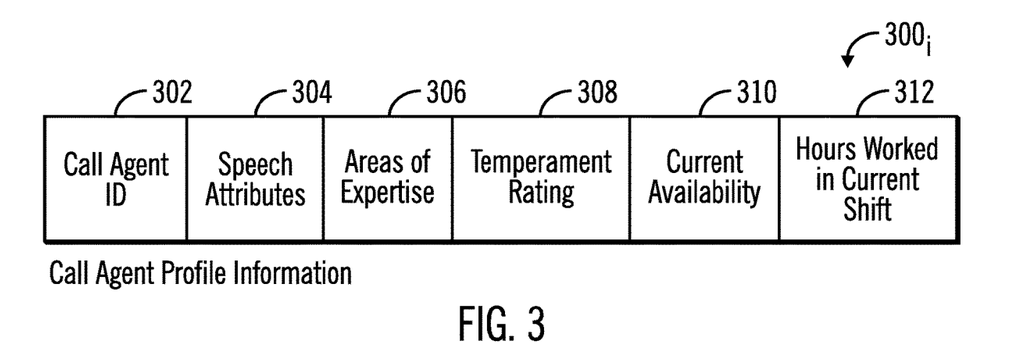
FIG. 3 illustrates an embodiment of call agent profile information.

FIG. 3 illustrates an embodiment of call agent profile information 300$_i$ having information on a call agent assisting with calls, and includes a call agent identifier (ID) 302; speech attributes 304 of the call agent, such as dialect, speech patterns, etc.; areas of expertise 306; a temperament rating 308, e.g., friendly, impatient, patient, sympathetic, combative, etc., which may be based on management observations, customer surveys or analyzing calls involving the call agent using a deep learning algorithm to determine call agent temperament; current availability 310 to receive calls; and hours worked in current shift 312, which is periodically updated.

Figure 4:
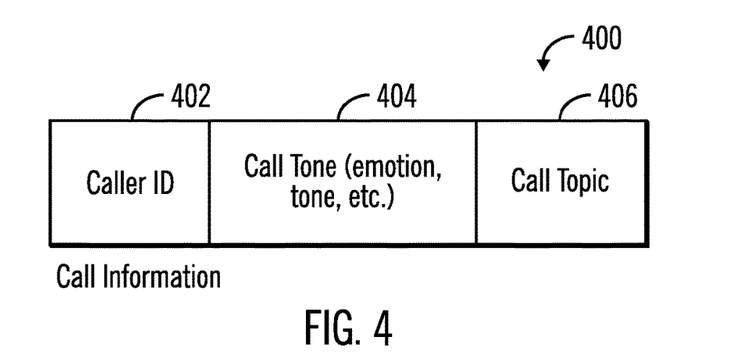
FIG. 4 illustrates an embodiment of call information.

FIG. 4 illustrates an embodiment of call information 400 for a call initiated by a telephone device $112_1$, $112_2$, $112_3$ and includes: a caller ID 402 of the caller initiating the call; a determined call tone 404, such as emotion, tone, etc., which may be updated throughout the call; and a call topic 406 describing the topic and subject matter of the call, which may be determined by the natural language processor 120.

Figure 5:
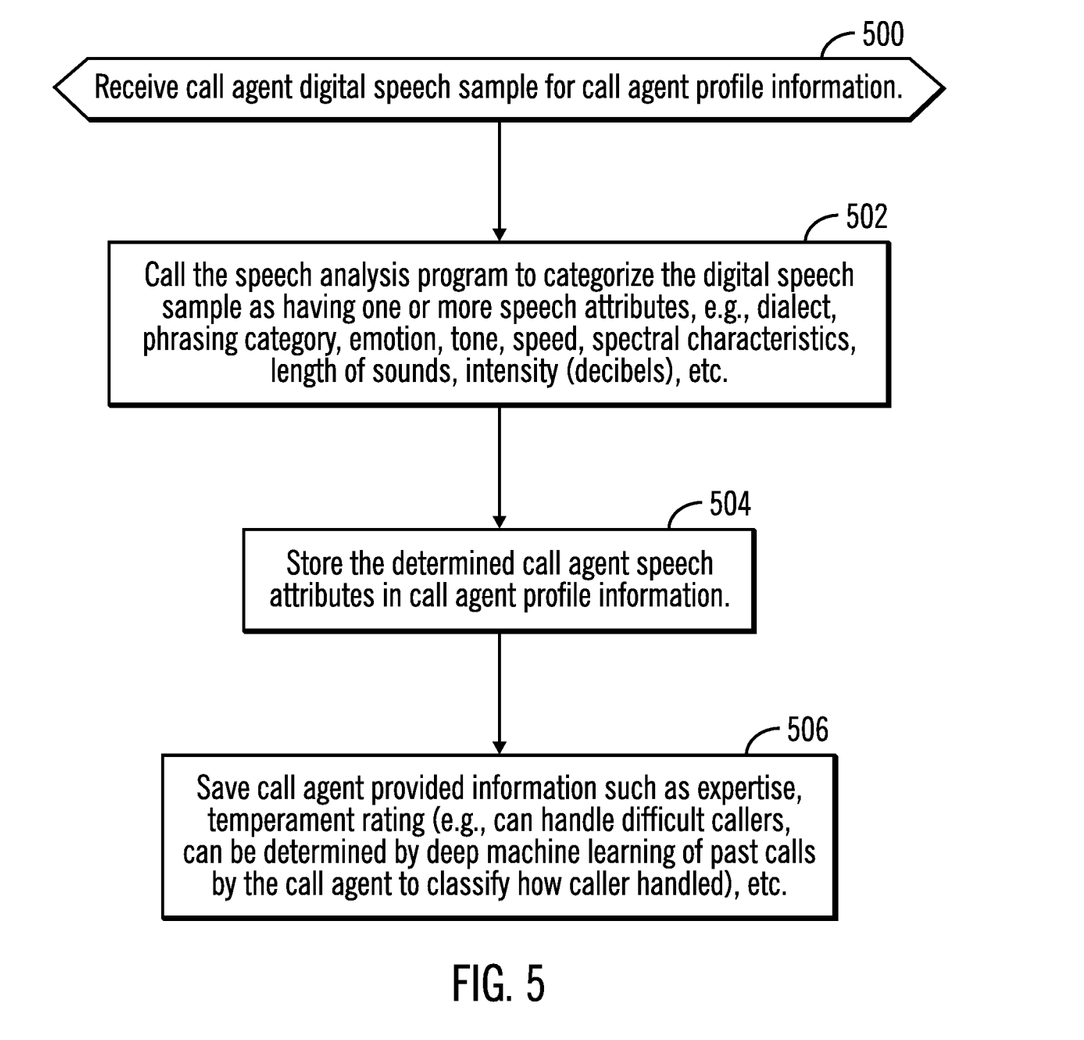
FIG. 5 illustrates an embodiment of operations to process a call agent digital speech sample for generating call agent profile information.

FIG. 5 illustrates an embodiment of operations performed by the profile generator 126 to process a call agent digital speech sample 136, which may be gathered from the call agents for the purpose of populating the call agent profile information $300_i$ for a call agent. Upon receiving (at block 500) a call agent digital speech sample 136, the profile generator 126 calls (at block 502) the speech analysis program 116 to categorize the digital speech sample 136 as having one or more speech attributes, e.g., dialect, phrasing category, emotion, tone, speed, spectral characteristics, length of sounds, intensity (decibels), etc. The determined call agent speech attributes may then be stored (at block 504) in the speech attributes 304 of the call agent profile information $300_k$. Additional call agent information, provided by the call agent and/or others in the organization or from other sources, may be gathered and stored (at block 506) in the profile information $300_i$, such as areas of expertise 306, a temperament rating 308 (e.g., can handle difficult callers, patient, impatient, rude, etc.), current availability 310 and hours worked in current shift 312. The areas of expertise 306 and temperament rating 308 may be determined by deep machine learning of past calls by the call agent to classify the previous calls into an area of expertise and temperament rating.

With the embodiment of FIG. 5, the call agent profile information $300_i$ is generated by using machine learning algorithms to analyze call agent digital speech samples 136 and previous calls to determine attributes of the call agent that may be used to select a call agent best suited for a particular caller.

FIGS. 6a, 6b, 6c, and 6d illustrate an embodiment of operations performed by the call manager 110 and/or the profile generator 126 to process and route a call from a caller phone $112_1$, $112_2$, $112_3$ to a call agent. Upon receiving (at block 600) a call from a caller over the voice network 114, the call manager 110 determines (at block 602) if this is a first call for the caller, i.e., whether there is no caller profile information $200_i$ for the caller. If (at block 602) this is a first call, then the profile manager 126 is called to create (at block 604) caller profile information $200_i$ for the caller, including any caller provided profile information 113, such as address, email, phone number, areas of interest, etc. If (at block 606) there are smartphone caller speech attributes 132, such as from the speech analysis application 128 at a smartphone $112_3$ used by the caller, then the caller speech attributes 132 from the smartphone, are added (at block 608) to the caller profile information $200_i$.

Figure 6A:
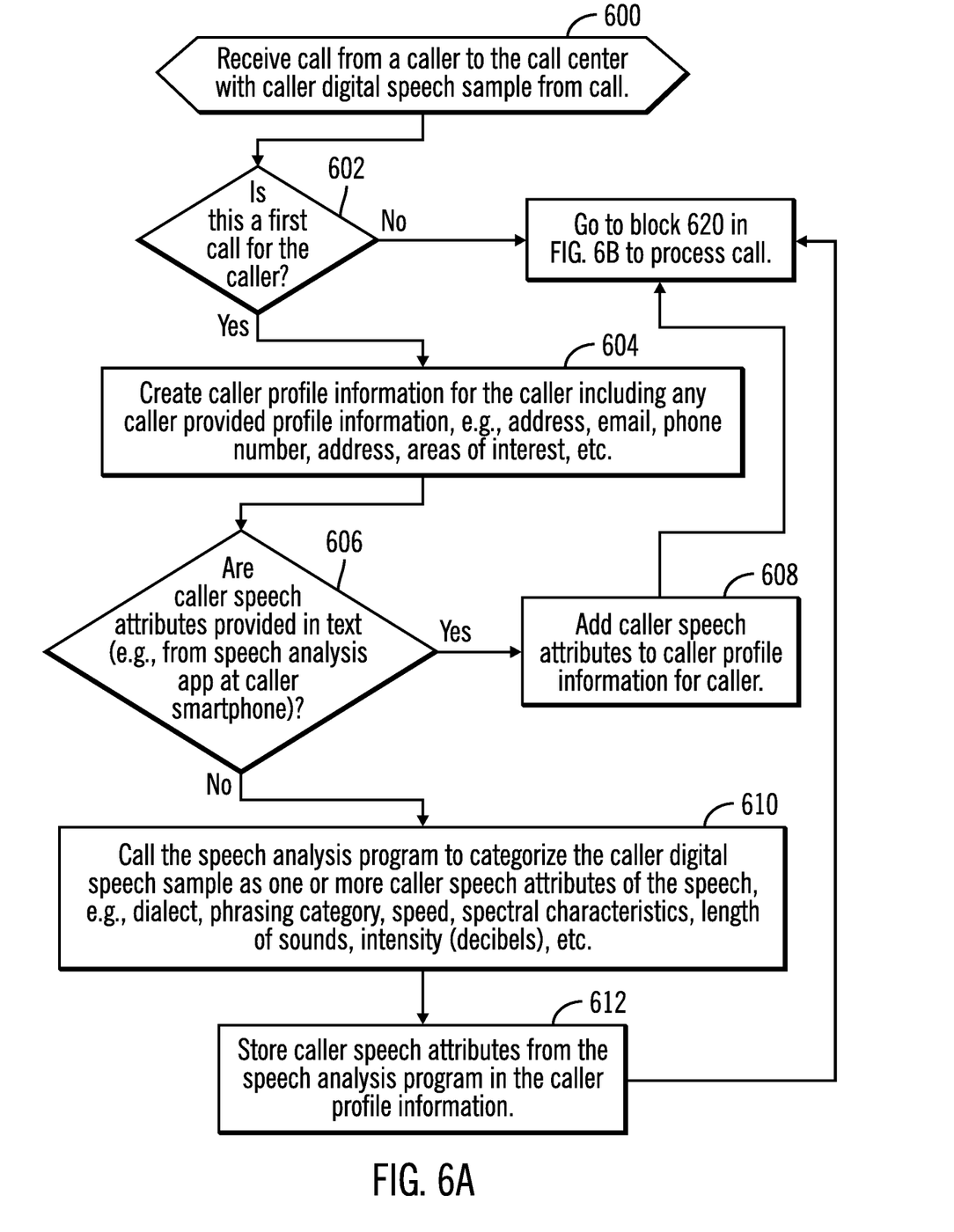
FIGS. 6a, 6b, 6c, and 6d illustrate an embodiment of operations to process a call and route to a selected call agent to handle.

If (at block 606) the caller is not on a smartphone to provide caller speech attributes 132, such as using a phone device $112_1$, $112_2$, then the profile generator 126 calls (at block 610) the speech analysis program 116 to categorize the caller digital speech sample 130a, i.e., as caller speech attributes 132a of the speech, e.g., dialect, phrasing category, speed, spectral characteristics, length of sounds, intensity (decibels), etc. The determined caller speech attributes 132a from the speech analysis program 116 are added (at block 612) to field 206 in the caller profile information $200_i$. After updating the caller speech attributes 206 (at blocks 608 or 612) or if this is not the first call for the caller and the caller has pre-existing caller profile information $200_k$ (from the no branch at block 602), control proceeds to block 620 in FIG. 6b to process the call.

Figure 6B:
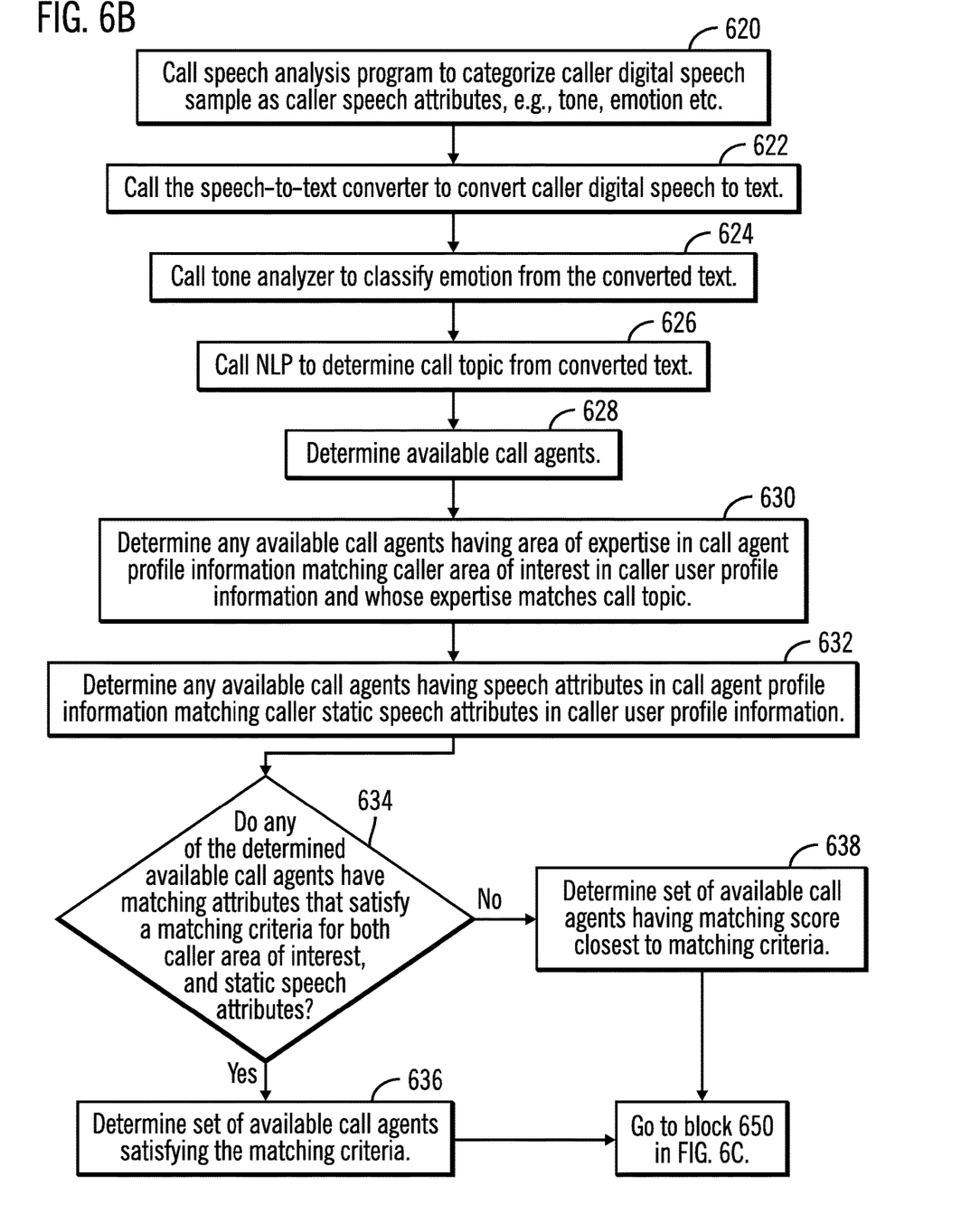

At block 620 in FIG. 6b, the call manager 110 calls the speech analysis program 116 to determine call specific speech attributes from the caller digital speech sample 130a, such as tone and emotion and saves as call tone 404 in the call information 400 for the call 400. The call manager 110 may call (at block 622) the speech-to-text converter 118 to convert the caller digital speech sample 130a to text. The tone analyzer 122 is then called (at block 624) to classify emotion from the converted text. The NLP 120 is called (at block 626) to classify and determine a call topic from the converted text, which is saved as call topic 406 in the call information 400. The available call agents are determined (at block 628) from current availability 310 in their call agent profile information $300_i$, such as those currently working, not currently servicing a call or who have a call queue below a call threshold for receiving new calls.

The call manager 110 then determines (at block 630) any available call agents having an area of expertise 306 in their call agent profile information $300_i$ that matches the caller area of interest 208 in the caller profile information $200_i$ and whose expertise 306 also matches the call topic 406 in the call information 400. The result of block 630 are those available call agents having the expertise and knowledge suitable to handle the call based on the caller profile information $200_i$ and classified call topic 406 of the call. A determination is also made (at block 632) of available call agents having speech attributes 304 in call agent profile information $300_i$ matching the caller speech attributes 206 in caller profile information $200_i$. A match may comprise an exact match or a match determined by stemming or a match determined by other criteria, such as relatedness of the caller and call agent information being compared, such as determined by a data mining algorithm that determines relatedness of information.

The call manager 110 then determines (at block 634) whether there are available call agents having matching attributes that satisfy a matching criteria for both the caller area of interest 208 and speech attributes 206, such as speaks in the same dialect or has similar speech patterns. If (at block 634) there is a set of one or more available call agents, then the call manager 110 determines (at block 636) the set of available call agents satisfying both criteria. Otherwise, if (at block 634) there are no agents that satisfy/match both criteria, then the call manager 110 determines (at block 638) a set of available call agents having a matching score closest to the matching criteria. From block 636 or 638, control proceeds to block 650 in FIG. 6c with the determined available call agents to consider.

Figure 6C:
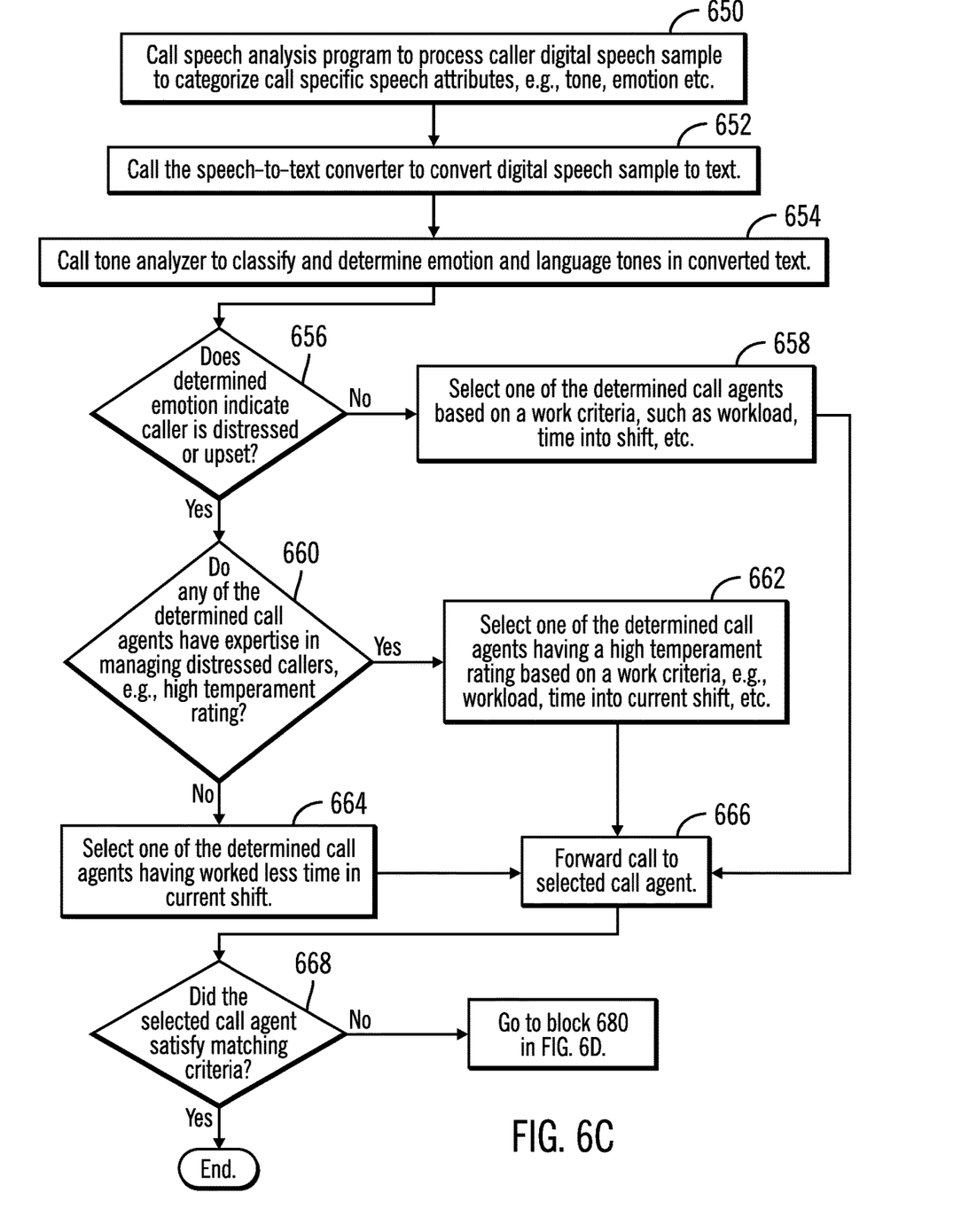

In FIG. 6c, the call manager 110 then considers the tone of the call, to determine whether the caller is distressed or upset, and to select one of the determined available call agents most suited for handling distressed callers. The call manager 110 calls (at block 650) the speech analysis program 116 to process caller digital speech sample 130a to categorize the specific speech attributes, e.g., tone and emotion. The tone and emotion may be determined directly by the speech analysis program 116 by analyzing the audio signal wave form information from the speech sample. Alternatively, the call manager 110 may determine the tone and emotion of the speech by calling (at block 652) the speech-to-text converter 118 to convert the caller digital speech sample 130a to text. The tone analyzer 122 is then called (at block 654) to classify and determine emotion and language tones in the converted text. The call manager 110 may perform steps 652 and 654 if the speech analysis program 116 does not classify emotion and tone. Alternatively, the call manager 110 may use both methods to determine emotion to confirm the findings.

If (at block 656) the determined emotion and tone indicates the caller is not distressed or upset, then the call manager 110 selects (at block 658) one of the determined call agents based on a work criteria, such as workload, hours worked in current shift 312, etc. If (at block 656) the determined emotion and tone indicates the caller is distressed or upset, then the call manager 110 determines (at block 660) whether any of the determined set of call agents have expertise in managing distressed callers, such as have a high temperament rating 308. If so, then the call manager 110 selects (at block 662) one of the determined call agents having the high temperament rating 308 based on a work criteria, such as workload, hours worked in current shift 312, etc. If (at block 660) none of the determined call agents have expertise in handling distressed callers, then the call manager 110 may select (at block 664) one of the determined call agents having worked less time in their hours worked in current shift 312. Agents that have recently started their shift may have more patience to handle a difficult caller than an agent that is long into their shift. After selecting one of the call agents at block 658, 662 or 664, the call is forwarded (at block 666) to the selected call agent.

Figure 6D:
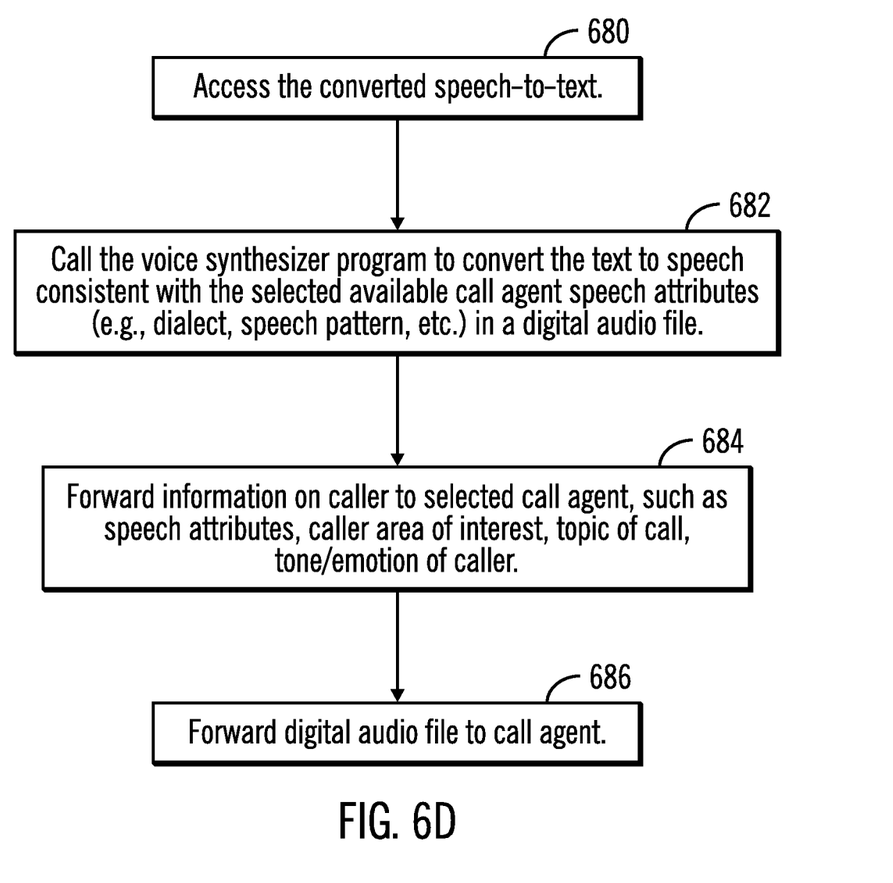

If (at block 668) the selected call agent did not satisfy the matching criteria, i.e., was determined in the set at block 638, then control proceeds to block 680 in FIG. 6d. Otherwise, if (at block 668) the selected agent did satisfy the matching criteria, i.e., was determined in the set at block 636, then control ends with the selected call agent, having matching speech attributes, e.g., dialect, speech pattern, and expertise for the call handling the call. If (at block 668) the selected call agent did not satisfy the matching criteria and may not be personally suited for optimized handling and customer service for the call, then at block 680 in FIG. 6d, the call manager 110 accesses (at block 680) the converted speech-to-text and calls (at block 682) the voice synthesizer program 124 to convert the text to speech consistent with the selected available call agent speech attributes (e.g., dialect, speech patterns, etc.) in a digital audio file. The call manager 110 may then forward (at block 684) any information on the caller to the selected call agent to reference to assist with the call, such as the caller speech attributes 206, caller area of interest 208, topic of call 406, tone/emotion of caller 404 when also forwarding (at block 686) the digital audio file of the call to the call agent, which will be in an audio form the call agent should readily understand because it will have similar speech attributes as the call agent, even if the caller and the call agent have dissimilar speech attributes.

With the embodiment of FIGS. 6a, 6b, 6c, 6d, the call manager uses machine learning programs, such as the speech analysis program 116, NLP 120, and tone analyzer 122 to classify speech attributes of the caller to compare with the speech attributes and areas of expertise of the call agents to select an optimal call agent to handle the call, based on the similarity of the speech of the caller and call agent and the expertise of the call agent with respect to the subject matter and topic of the call. Further, described embodiments utilize tone analyzer 122 and speech analysis technology to determine an emotion of the caller, and if the caller is determined to be distressed, a call agent is selected that is particularly disposed to assist with distressed callers, to further optimize the agent selection. In this way, the described embodiments optimize the selection of a call agent to which to route a call based on multiple parameters of the call, the caller profile information, and the call agent as determined by machine learning and deep learning algorithms implemented in the programs analyzing, classifying and processing the call, caller profile information, and call agent profile information.

The described call management system 100 may be deployed in an ecommerce implementation for a retailer to use to optimize selection of customer support agents to service a particular user call based on the topic of the call, caller speech attributes, such as dialect and speech patterns, and the emotional state of the caller. In further implementations, the call management system 100 may be used for other implementations, such as for customer support for government agencies, for medical health care providers, psychological assistance, educational assistance, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
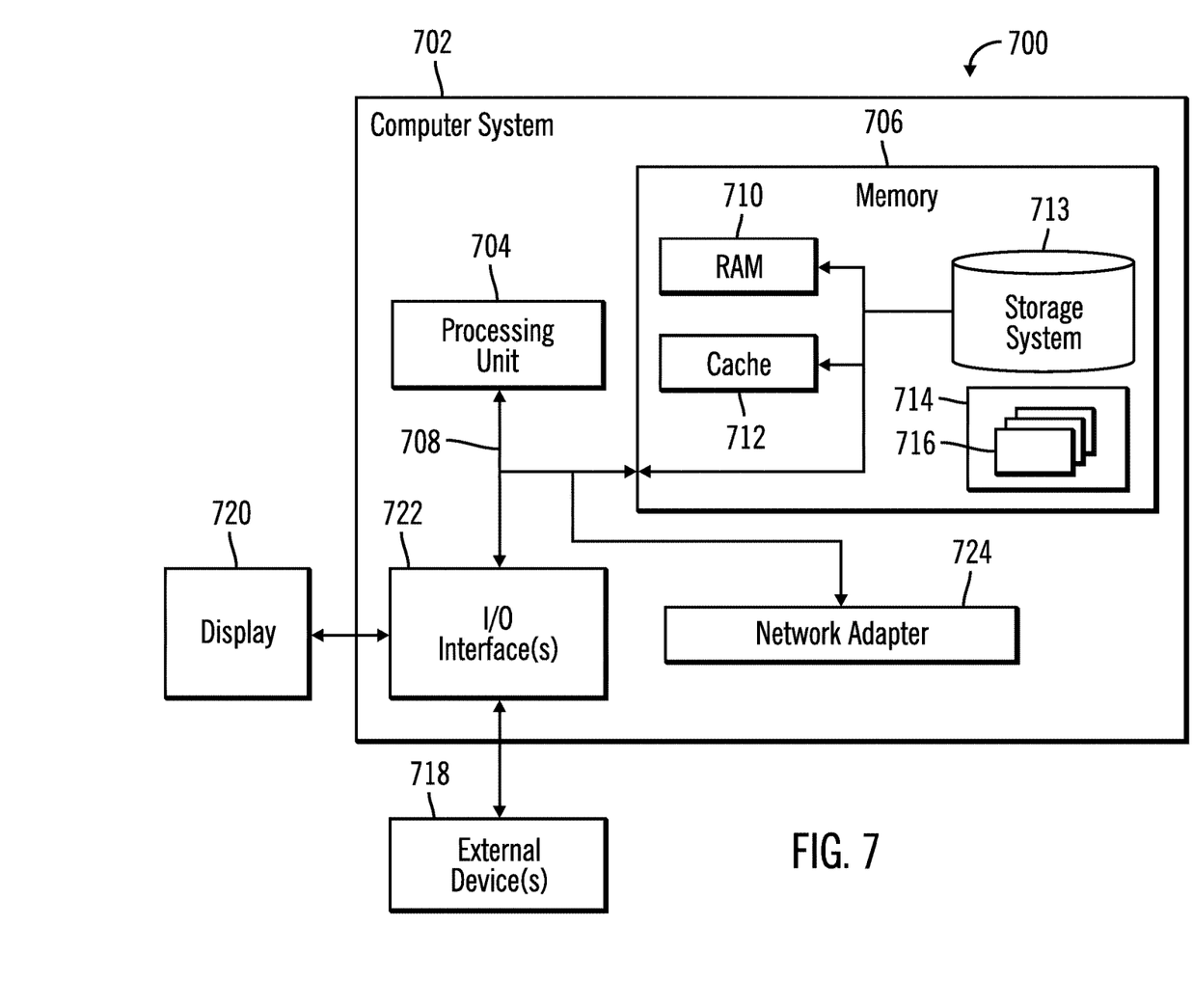
FIG. 7 illustrates a computing environment in which the components of FIG. 1 may be implemented.

The computational components of FIG. 1, including the call management system 100 and smartphone $112_3$ may be implemented in one or more computer systems, such as the computer system 702 shown in FIG. 7. Computer system/server 702 may be described in the general context of computer system executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system/server 702 is shown in the form of a general-purpose computing device. The components of computer system/server 702 may include, but are not limited to, one or more processors or processing units 704, a system memory 706, and a bus 708 that couples various system components including system memory 706 to processor 704. Bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media.

System memory 706 can include computer system readable media in the form of volatile memory, such as random access memory (RAM) 710 and/or cache memory 712. Computer system/server 702 may further include other removable/non-removable, volatile/non-volatile computer system storage media. By way of example only, storage system 713 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 708 by one or more data media interfaces. As will be further depicted and described below, memory 706 may include at least one program product having a set (e.g., at least one) of program modules that are configured to carry out the functions of embodiments of the invention.

Program/utility 714, having a set (at least one) of program modules 716, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. The components of the computer 702 may be implemented as program modules 716 which generally carry out the functions and/or methodologies of embodiments of the invention as described herein. The systems of FIG. 1 may be implemented in one or more computer systems 702, where if they are implemented in multiple computer systems 702, then the computer systems may communicate over a network.

Computer system/server 702 may also communicate with one or more external devices 718 such as a keyboard, a pointing device, a display 720, etc.; one or more devices that enable a user to interact with computer system/server 702; and/or any devices (e.g., network card, modem, etc.) that enable computer system/server 702 to communicate with one or more other computing devices. Such communication can occur via Input/Output (I/O) interfaces 722. Still yet, computer system/server 702 can communicate with one or more networks such as a local area network (LAN), a general wide area network (WAN), and/or a public network (e.g., the Internet) via network adapter 724. As depicted, network adapter 724 communicates with the other components of computer system/server 702 via bus 708. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

The letter designators, such as i,j are used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for routing a call from a caller to a call agent at a call center, wherein the computer program product comprises a computer readable storage medium having program instructions embodied therewith that when executed cause operations, the operations comprising:

processing digital speech samples of call agents to categorize speech as having call agent speech attributes;

receiving information on a caller speech attribute initiating a call to the call center, wherein the caller speech attribute results from categorizing a caller digital speech sample of the caller as having the caller speech attribute;

determining a set of call agents having call agent speech attributes related to the caller speech attribute;

determining whether the caller speech attribute is categorized as being distressed;

selecting a call agent, from the set of call agents, having call agent information satisfying a criteria with respect to the caller being distressed; and routing the call to the selected call agent to process the call.

2. The computer program product of claim 1, wherein the operations further comprise:

storing information on the call agent speech attributes for the call agents determined by categorizing digital speech samples of the call agents in the call agent information for each of the call agents; and storing information on the caller speech attribute, determined by processing the caller digital speech sample, in caller profile information, wherein the selecting the call agent comprises processing information on the caller speech attribute in the caller profile information to determine a matching call agent speech attribute in the caller profile information to select the call agent.

3. The computer program product of claim 2, wherein the caller profile information further includes information on a caller interest, and wherein the call agent information further includes information on an area of expertise, wherein the selecting the call agent further comprises:

processing information on the caller interest in the caller profile information to determine call agent profile information having an area of expertise matching the caller interest, wherein the selected call agent has a matching call agent speech attribute and a matching area of expertise to the caller speech attribute and the caller interest, respectively.

4. The computer program product of claim 1, wherein the caller and the call agent speech attributes include at least one of regional speech dialect and speech patterns.

5. The computer program product of claim 1, wherein the caller speech attribute indicates an emotion of the speech for the call being routed, and wherein the emotion of the speech is used to determine whether the caller speech attribute is categorized as being distressed.

6. The computer program product of claim 5, wherein the call agent information satisfies the criteria with respect to the caller being distressed in response to at least one of:
  call agent profile information indicates the call agent has expertise in handling distressed callers; and
  the call agent that has worked a fewest number of hours in a current agent shift.

7. The computer program product of claim 5, wherein the determining the emotion of the speech comprises at least one of:
  using a speech analysis program to process the caller digital speech sample to determine the emotion from a sound wave encoded in the caller digital speech sample; and
  converting the caller digital speech sample to text and using a tone analyzer program to determine the emotion from the text.

8. The computer program product of claim 1, wherein the processing a digital speech sample of a call agent comprises:
  converting the caller digital speech sample to text; and
  processing the text, using natural language processing software, to categorize the text as a topic of a plurality of topics,
  wherein the selecting the call agent comprises processing call agent information to select a call agent having indicated expertise for the topic of the text.

9. The computer program product of claim 1, wherein the operations further comprise:
  determining that there is no call agent having a call agent speech attribute that matches the caller speech attribute;
  selecting an available call agent in response to determining that there is no call agent having a speech attribute matching the caller speech attribute; and
  forwarding information on the caller speech attribute to the selected available call agent to use as hints to assist with the call.

10. The computer program product of claim 1, wherein the operations further comprise:
  determining that there is no call agent having a speech attribute that matches the caller speech attribute;
  selecting an available call agent in response to determining that there is no call agent having a speech attribute matching the caller speech attribute;
  converting, using a voice-to-text converter program, the caller digital speech sample to text;
  converting, using a voice synthesizer program, the text to a digital audio file having the speech consistent with the speech attribute of the selected available call agent; and
  forwarding the digital audio file to the selected available call agent to use to assist with the call.

11. A system for routing a call from a caller to a call agent at a call center, comprising:
  a processor; and
  a computer readable storage medium having program instructions embodied therewith that when executed by the processor cause operations, the operations comprising:
    processing digital speech samples of call agents to categorize speech as having call agent speech attributes;
    receiving information on a caller speech attribute initiating a call to the call center, wherein the caller speech attribute results from categorizing a caller digital speech sample of the caller as having the caller speech attribute;
    determining a set of call agents having call agent speech attributes related to the caller speech attribute;
    determining whether the caller speech attribute is categorized as being distressed;
    selecting a call agent, from the set of call agents, having call agent information satisfying a criteria with respect to the caller being distressed; and
    routing the call to the selected call agent to process the call.

12. The system of claim 11, wherein the operations further comprise:
  storing information on the call agent speech attributes for the call agents determined by categorizing digital speech samples of the call agents in the call agent information for each of the call agents; and
  storing information on the caller speech attribute, determined by processing the caller digital speech sample, in caller profile information,
  wherein the selecting the call agent comprises processing information on the caller speech attribute in the caller profile information to determine a matching call agent speech attribute in the caller profile information to select the call agent.

13. The system of claim 11, wherein the caller speech attribute indicates an emotion of the speech for the call being routed, and wherein the emotion of the speech is used to determine whether the caller speech attribute is categorized as being distressed.

14. The system of claim 13, wherein the call agent information satisfies the criteria with respect to the caller being distressed in response to at least one of:
  the call agent information indicates the call agent has expertise in handling distressed callers; and
  the call agent that has worked a fewest number of hours in a current agent shift.

15. The system of claim 11, wherein the processing a digital speech sample of a call agent comprises:
  converting the caller digital speech sample to text; and
  processing the text, using natural language processing software, to categorize the text as a topic of a plurality of topics,
  wherein the selecting the call agent comprises processing call agent information to select a call agent having indicated expertise for the topic of the text.

16. The system of claim 11, wherein the operations further comprise:
  determining that there is no call agent having a call agent speech attribute that matches the caller speech attribute;
  selecting an available call agent in response to determining that there is no call agent having a speech attribute matching the caller speech attribute; and
  forwarding information on the caller speech attribute to the selected available call agent to use as hints to assist with the call.

17. A computer implemented method for routing a call from a caller to a call agent at a call center, comprising:
processing digital speech samples of call agents to categorize speech as having call agent speech attributes;
receiving information on a caller speech attribute initiating a call to the call center, wherein the caller speech attribute results from categorizing a caller digital speech sample of the caller as having the caller speech attribute;
determining a set of call agents having call agent speech attributes related to the caller speech attribute;
determining whether the caller speech attribute is categorized as being distressed;
selecting a call agent, from the set of call agents, having call agent information satisfying a criteria with respect to the caller being distressed; and
routing the call to the selected call agent to process the call.

18. The method of claim 17, further comprising:
storing information on the call agent speech attributes for the call agents determined by categorizing digital speech samples of the call agents in the call agent information for each of the call agents; and
storing information on the caller speech attribute, determined by processing the callerdigital speech sample, in caller profile information,
wherein the selecting the call agent comprises processing information on the caller speech attribute in the caller profile information to determine a matching call agent speech attribute in the caller profile information to select the call agent.

19. The method of claim 17, wherein the caller speech attribute indicates an emotion of the speech for the call being routed, and wherein the emotion of the speech is used to determine whether the caller speech attribute is categorized as being distressed.

20. The method of claim 19, wherein the call agent information satisfies the criteria with respect to the caller being distressed in response to at least one of:
call agent profile information indicates the call agent has expertise in handling distressed callers; and
the call agent that has worked a fewest number of hours in a current agent shift.

21. The method of claim 17, wherein the processing a digital speech sample of a call agent comprises:
converting the caller digital speech sample to text; and
processing the text, using natural language processing software, to categorize the text as a topic of a plurality of topics,
wherein the selecting the call agent comprises processing call agent information to select a call agent having indicated expertise for the topic of the text.

22. The method of claim 17, further comprising:
determining that there is no call agent having a call agent speech attribute that matches the caller speech attribute;
selecting an available call agent in response to determining that there is no call agent having a speech attribute matching the caller speech attribute; and
forwarding information on the caller speech attribute to the selected available call agent to use as hints to assist with the call.

* * * * *